(No Model.)

J. F. SWAB.
Can for Transporting Milk.

No. 242,713.  Patented June 7, 1881.

Witnesses:
M. M. Lacey
B. G. Wells

Inventor
Joseph F. Swab
By R. S. & A. P. Lacey
Attys.

UNITED STATES PATENT OFFICE.

JOSEPH F. SWAB, OF CEDAR RAPIDS, IOWA.

CAN FOR TRANSPORTING MILK.

SPECIFICATION forming part of Letters Patent No. 242,713, dated June 7, 1881.

Application filed May 4, 1880. (No model.)

*To all whom it may concern:*

Be it known that I, JOSEPH F. SWAB, a citizen of the United States, residing at Cedar Rapids, in the county of Linn and State of Iowa, have invented certain new and useful Improvements in Cans for Transporting Milk; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide an improved float for cans employed for transporting milk; and it consists in the peculiarly-shaped float hereinafter described and claimed.

Figure 1:
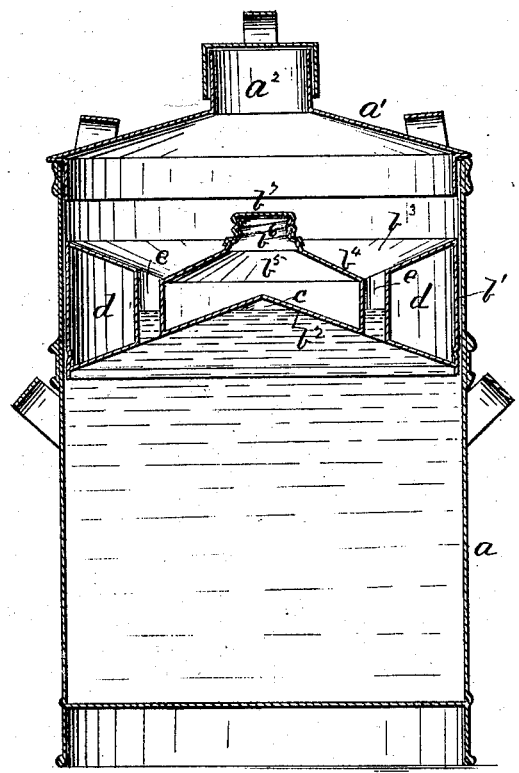
Figure 2:
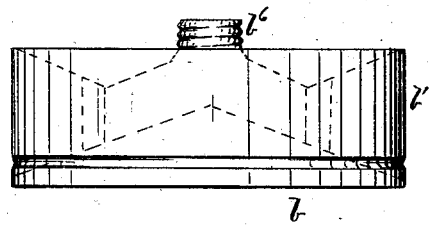

In the drawings, Figure 1 is a vertical section of a milk-can and my improved float, and Fig. 2 is a side elevation of the float.

$a$ is the milk-can, of ordinary form, being provided with a lid, as shown.

$b$ is the float, made preferably of tin. It is made hollow, so as to provide a large air-chamber between its upper and under plates. It floats readily on the top of the milk. The rim $b'$ fits snugly and slides vertically in the can. The under plate or bottom, $b^2$, has its periphery secured by water-tight joint to the lower edge of the rim $b'$, and has its center pressed upward so as to give it a cone shape, as shown. The cone-shaped space below the under plate makes the float ride more steadily on the top of the milk. The upper or top plate, $b^3$, has its periphery secured by tight joint to the upper edge of the rim $b'$. The top is depressed at a point intermediately between its periphery and center, so as to form a concave or annular trough, $b^4$, surrounding a conical-shaped center, $b^5$, the apex of which rises to a point above a level with the upper edge of the rim $b'$. The apex of this cone-shaped center is carried upward and formed into an open stem or nipple, $b^6$, which may be made to project to any desired height above the float; but it need not project more than an inch for practical purposes. The object of having the stem above the level of the upper edge of the rim $b'$ is to prevent any possible overflow of milk from the trough $b^4$ into the float, as will be fully understood from the explanation hereinafter given. The stem $b^6$ need not project above the surface of the float; but in case it did thus project greater care would be required in pouring the milk into the can. The stem $b^6$ is covered by a cap, $b^7$, which fits loosely, so that air can readily pass under it either into or out of the float. I prefer to employ the ordinary screw-cap, as shown.

A float constructed as hereinbefore described, having its bottom conical shape, with no opening at the center or apex, will ride on the surface of the milk and preserve the latter in quieter condition. There will be a space, $c$, at the apex, into which the air will be compressed. The body of compressed air in the space $c$ serves as an elastic pivotal support, which aids in keeping the float more steady and firm in its position.

The float constructed as described hereinbefore contains a large air-chamber, $d$, between its upper and under plates, and a compressed air-space, $c$, below it, so that it will be carried by the milk and preserve the latter in a perfectly quiet condition.

$e$ $e$ are two vertical pipes, open at both ends and put through the float, having their ends secured by water-tight joints to the upper and under plate. They are arranged with their upper ends in the bottom of the trough $b^4$, so that the milk will all flow out of the latter down into the can. I have shown only two of these pipes; but it will be understood that there may be three, four, or more, arranged at suitable distances apart. The milk is poured onto the top of the float, and runs down into the can through the openings $e$ $e$. The cap $b^3$ prevents any of the milk from getting into the float. In case the milk be poured into the can faster than it will run down through the opening $e$, the stem $b^6$, by projecting upward, as hereinbefore described, will rise to a height that will prevent overflow into the chamber $d$.

In the ordinary hollow floats great inconvenience has been experienced, because they will be burst open at the seams by the expansion and contraction of the air within caused by the different and changing temperature of the milk. In my device this difficulty is entirely overcome. The open neck $b^6$ permits the air from above to flow into or out of the chamber $d$, and thus preserve an equilibrium which prevents the bursting open of the seams. The cap $b^7$ is employed to prevent any possible splashing of milk over into the chamber $d$, and it is especially serviceable when the milk is poured through the neck $a^2$ of the lid $a'$. If the lid $a'$ be removed, the milk can be easily poured into the can without liability of splashing over into the chamber $d$, even if the cap $b^7$ be off the stem $b^6$.

Having thus described my invention, what I claim, and desire to secure by Letters Patent, is—

1. In a transportation milk-can, a hollow float having its top plate formed with an annular trough between its center and periphery, and provided at its center with an open neck projecting upward to a point in the same horizontal plane with or above the plane of the periphery, and having one or more descending pipes, the upper ends of which open into the bottom of the annular trough, substantially as set forth.

2. A hollow float for milk-cans, composed of a conical under plate closed at its apex, a vertical rim fitting snugly against the sides of the can, a top plate formed into an annular trough surrounding its center, and having its center raised to or above the plane of its periphery and formed into an open neck, and pipes open at both ends and secured to the upper and under plates, the upper ends opening into the bottom of the annular trough, substantially as set forth.

In testimony whereof I affix my signature in presence of two witnesses.

JOSEPH F. SWAB.

Witnesses:
WILLIAM F. MANZ,
A. ST. CLAIR SMITH.